(12) United States Patent
Kitayama et al.

(10) Patent No.: US 8,437,662 B2
(45) Date of Patent: May 7, 2013

(54) DRIVING FORCE TRANSMITTING DEVICE AND IMAGE FORMING APPARATUS INCLUDING THE SAME

(75) Inventors: Kunihiko Kitayama, Abiko (JP); Kohei Deno, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 327 days.

(21) Appl. No.: 12/851,868

(22) Filed: Aug. 6, 2010

(65) Prior Publication Data

US 2011/0033206 A1 Feb. 10, 2011

(30) Foreign Application Priority Data

Aug. 7, 2009 (JP) .................................. 2009-185128

(51) Int. Cl.
*G03G 15/00* (2006.01)
(52) U.S. Cl.
USPC ......................................................... 399/167
(58) Field of Classification Search .................... 399/167
See application file for complete search history.

(56) References Cited

U.S. PATENT DOCUMENTS 7,856,195 B2 * 12/2010 Seto .............................. 399/167
2010/0125015 A1 5/2010 Deno

FOREIGN PATENT DOCUMENTS

JP 07-036346 A 2/1995
JP 2006-078907 A 3/2006

* cited by examiner

*Primary Examiner* — Hoang Ngo
(74) *Attorney, Agent, or Firm* — Fitzpatrick, Cella, Harper & Scinto

(57) ABSTRACT

A driving force transmitting apparatus includes a driving source, a drive pulley rotatable by a driving force supplied from the driving source, a follower pulley rotatable with a member to be rotated, and a belt member extending around a cylindrical surface of the driving pulley and a cylindrical surface of the follower pulley. In addition, an intermediate transmission member contacts the driving pulley and the follower pulley, and the intermediate transmission member has a rigidity higher than that of the belt member.

14 Claims, 7 Drawing Sheets

DRIVING FORCE TRANSMITTING DEVICE AND IMAGE FORMING APPARATUS INCLUDING THE SAME

FIELD OF THE INVENTION AND RELATED ART

The present invention relates to a driving force transmitting device using a pulley and a belt member and relates to an electrophotographic image forming apparatus, including such a driving force transmitting device, such as a copying machine, a facsimile machine, a printer or a multi-function machine.

In the image forming apparatus such as the copying machine or a printer, the driving force transmitting device for rotationally driving a photosensitive drum which is an image bearing member or rotationally driving an intermediary transfer belt is required to have a high-precision rotation performance with less rotation non-uniformity. For example, in a color image forming apparatus of a four-drum type in which four drums for yellow (Y), magenta (M), cyan (C) and black (K) are used, belt or color misregistration occurs due to the rotation non-uniformity of the photosensitive drum or the intermediary transfer belt, so that an image quality is impaired. Incidentally, the belt is such a phenomenon that sparseness/denseness of writing intervals by a laser on the photosensitive drum surface occurs with respect to a sub-scan direction due to the rotation non-uniformity of, e.g., the photosensitive drum, and thus density non-uniformity occurs during printing.

As a countermeasure against the belt and the color misregistration, an encoder for monitoring the rotation non-uniformity was provided on a rotational axis of a driving roller for the photosensitive drum or the intermediary transfer belt and on the basis of a signal of the encoder, rotation of the driving source has been controlled. Thus, the rotation non-uniformity of the driving roller for the photosensitive drum or the intermediary transfer belt is suppressed, so that the belt and the color misregistration are prevented. Incidentally, as the driving source used in such a driving device, a DC motor or a stepping motor may be used.

Further, as a structure for transmitting a driving force from the driving source, a reduction gear train is generally used. That is, a rotational driving force of the driving source is transmitted to the driving roller for the photosensitive drum or the intermediary transfer belt through the reduction gear train in a speed reduction manner. However, in the case where such a reduction gear train is used, the rotation non-uniformity occurs even at an engaging portion between gears due to a manufacturing error of the gears, so that there arises a problem that the belt occurs and thus the image quality is lowered. As a countermeasure against the belt with respect to the reduction gear train, such an attempt that processing accuracy or rigidity of the respective gears was enhanced or that inertial mass (flywheel) was attached on the rotational axis of the driving roller for the photosensitive drum or the intermediary transfer belt has been made.

However, even when the processing accuracy or rigidity of each of the gears of the reduction gear train is enhanced or the inertial mass (flywheel) is provided, there is a limit to a suppressing effect on the rotation non-uniformity of the photosensitive drum or the intermediary transfer belt. Particularly, in recent years, with high-definition image forming process by formation of toner particles in a small particle size or formation of minute exposure spots, a demand for alleviating the rotation non-uniformity becomes increasingly severe, so that a conventional method is being in a state in which it cannot meet the demand.

For this reason, a proposal such that a driving force transmitting device using an endless non-toothed belt of steel and a pulley, not a toothed drive transmission means such as a gear or a timing belt was applied to the image forming apparatus has been proposed. That is, a driving device including a driving device for being rotationally driven by a driving source, a driven pulley rotated together with a member to be rotated such as the driving roller for the photosensitive drum or the intermediary transfer belt, and the non-toothed belt member stretched on a cylindrical surface of the driving pulley and the cylindrical surface of the driven pulley has been known. Such a driving device has no tooth at a power transmitting portion, so that it has an advantage that the rotation non-uniformity or belt due to an engaging portion does not occur in principle (e.g., Japanese Laid-Open Patent Application No. Hei 7-36346).

However, in the conventional driving force transmitting device using the belt member and the pulley, the following problems arise. First, there is a problem of responsiveness of the driving pulley and the driven pulley. For example, similarly as in the above-described case, in the case of the structure in which the encoder for monitoring the rotation non-uniformity is provided on the rotational axis of the driven pulley and the rotation of the driving source is controlled on the basis of the signal of the encoder, there is a need to increase the responsiveness of the driving pulley and the driven pulley. However, e.g., when the belt member is been on its tension side (where a tension pulley is not provided) by a change in tension of the belt member due to a driven pulley-side load variation, a restrictive property at a phase relation between the driving pulley and the driven pulley is eliminated. That is, to the belt member to be stretched between the driving pulley and the driven pulley, a predetermined tension is applied by the tension pulley. However, when the load variation as described above occurs, the tension of the belt member is changed and thus a position of the tension pulley is also changed, so that the bending occurs on the side where the tension pulley is not provided. As a result, the responsiveness of the driving pulley and the driven pulley is lowered. That is, to the belt member to be stretched between the driving pulley and the driven pulley, a predetermined tension is applied by the tension pulley. However, when the load variation as described above occurs, the tension of the belt member is changed and thus a position of the tension pulley is also changed, so that the bending occurs on the side where the tension pulley is not provided. As a result, the responsiveness of the driving pulley and the driven pulley is lowered.

Such lowering in responsiveness occurs when the load on the driven pulley side is abruptly reduced or changed into a reverse load. Specifically, in the case where a cleaner, such as a blade or a brush, of a belt cleaning device for removing residual toner on the intermediary transfer belt is moved toward and away from the intermediary transfer belt, the decrease in load occurs when the cleaner is moved away from the intermediary transfer belt.

Further, in the case where a difference in rotational speed is provided between the photosensitive drum and the intermediary transfer belt, the reverse load as described below can occur. That is, in the case where a peripheral speed of the intermediary transfer belt is set at a value which is higher than that of the photosensitive drum at a primary transfer portion where a toner image is transferred from the photosensitive drum onto the intermediary transfer belt, when an electrostatic attraction force is generated at the primary transfer portion by application of a high voltage, a force from the intermediary transfer belt acts on the photosensitive drum. In this case, the photosensitive drum is in a state in which it receives the driving force from two members of the intermediary transfer belt and the driving device for the photosensitive drum. In the case where the above-described electrostatic attraction force exceeds, e.g., a brake force of the cleaner of the cleaning device for removing the residual toner on the photosensitive drum, the photosensitive drum is driven by the intermediary transfer belt. That is, the reverse load by which a driving force transmission path in a normal operation is reversed occurs. Further, such a reverse load state is abruptly generated, in the conventional belt driving device, control is lost and thus the color misregistration occurs.

Further, in the case of the conventional belt driving device, there is a problem such that a lifetime of the device is reduced by a slip (sliding) generated between the pulley and the belt. As described above, the non-toothed driving system is advantageous for belt prevention but is less liable to obtain a power transmitting ability as obtained by engagement by gear teeth. Further, in the case where the slip occurs, the belt is abraded and is liable to be bent, so that the lifetime of the driving device is shortened. Particularly, in the case of a speed reduction mechanism including the driven pulley having an outer diameter larger than that of the driving pulley, a length of winding of the belt about the driving pulley having the smaller outer diameter is short, i.e., a contact area between the driving pulley and the belt is small, so that the slip is liable to occur.

Further, during actuation of the device, not only frictional loads of the respective members are applied but also inertial load is added, so that the slip is liable to occur particularly. For this reason, as a countermeasure against the slip during the actuation, it would be considered that, e.g., a method in which a motor actuation profile is slowly raised is adopted. However, the method in which the motor actuation profile is slowly raised is effective as the countermeasure against the inertial load but cannot meet such a phenomenon (load) that the friction load is temporarily increased.

A specific example of the load may include those of the cleaner for the photosensitive drum and a transfer cleaner after these cleaners are left standing. That is, a cleaner blade which is a rubber member of such cleaners closely contacts the photosensitive drum or the intermediary transfer belt by being left standing and thus the load is increased when compared with the case of the normal operation. Further, at a nip of the cleaner blade, collected transfer residual toner is fixedly deposited to increase the load in some cases. Further, also at a seal portion where scattering toner is prevented from entering a portion for supporting an end portion of the photosensitive drum, a similar toner deposition (sticking) phenomenon occurs. Further, in the case of, e.g., a structure for supporting a roller such as a primary transfer roller disposed in the intermediary transfer belt by a sliding bearing, the scattering toner enters and is deposited on a sliding portion of the bearing and can cause the load phenomenon due to a similar toner deposition. With respect to such a friction load increasing phenomenon, it is effective that the change in state (close contact state or deposition or sticking state) is accelerated by an impulse force (impact force) through instantaneous rising rather than the slow rising. This is contradictory to the slow rising as the counter measure against the inertial load.

On the other hand, it would also be considered that a method of increasing the drive transmitting force by increasing the tension of the belt is employed but this method causes a decrease in lifetime of the belt by an increase in stress of the belt accompanying the increased tension. Further, radial load acting on each of the pulleys is increased, so that such a problem that the lifetimes of the parts such as the bearings for supporting the respective pulleys are shortened.

SUMMARY OF THE INVENTION

A principal object of the present invention is to provide a driving force transmitting device, using a pulley and a belt member, capable of enhancing rotation stability of the belt member.

Another object of the present invention is to provide an image forming apparatus including the driving force transmitting device.

According to an aspect of the present invention, there is provided

According to an aspect of the present invention, there is provided a driving force transmitting apparatus comprising a driving source; a drive pulley rotatable by a driving force supplied from said driving source; a follower pulley rotatable with a member to be rotated; a belt member extending around a cylindrical surface of said driving pulley and a cylindrical surface of said follower pulley; and an intermediate transmission member disposed between said driving pulley and said follower pulley, said intermediate transmission member having a rigidity higher than that of said belt member and contacted to said pulley or opposed to said pulley with said belt member therebetween.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiment 1

Figure 1:
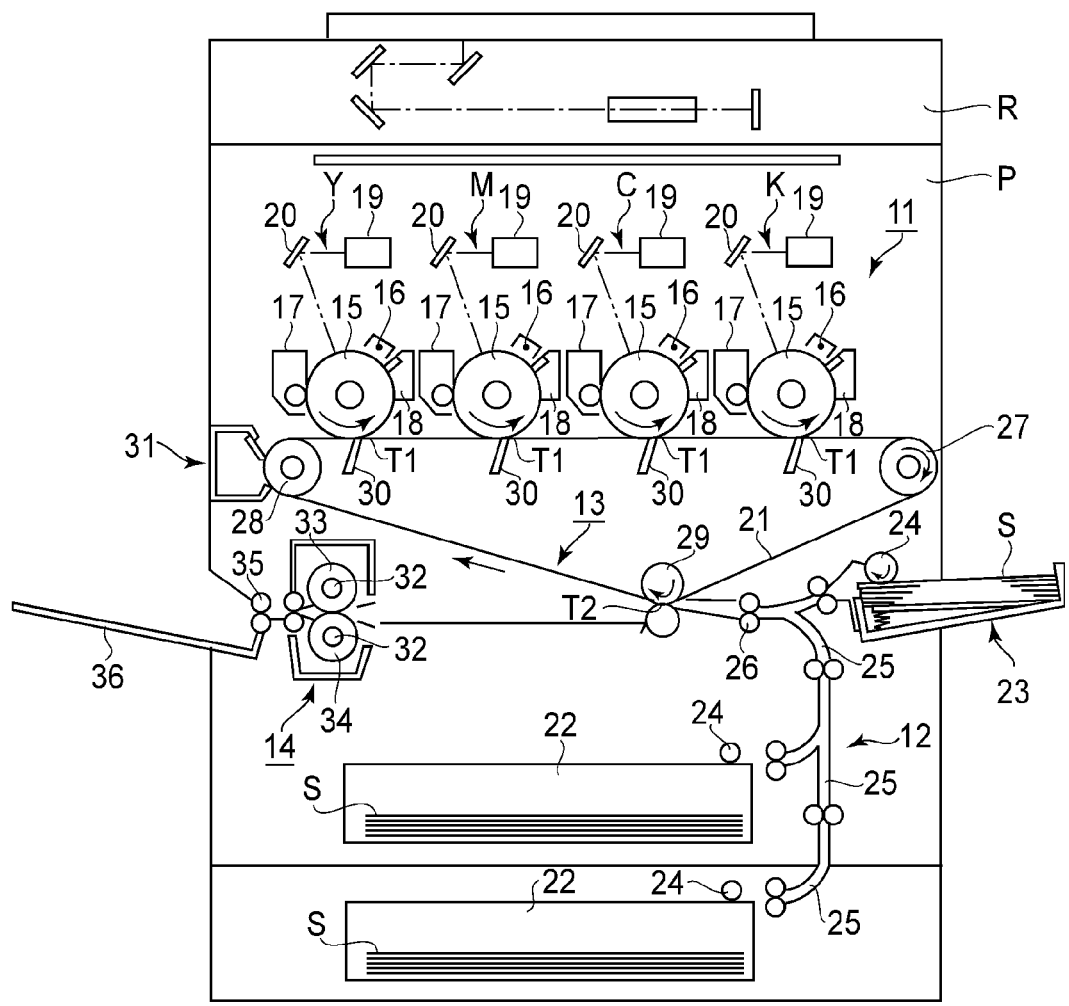
FIG. 1 is a schematic view for illustrating an image forming apparatus including a driving device in a First Embodiment according to the present invention.

Next, referring to FIGS. 1-6, the first preferred embodiment of the present invention will be described. First, the image forming apparatus in this embodiment will be described with reference to FIG. 1. The image forming apparatus in this embodiment is a full-color laser beam printer of the intermediary transfer type, and also, of the tandem type. That is, it has four image formation stations, more specifically, yellow (Y), magenta (M), cyan (c), and black (K) image formation stations, which are in parallel to each other. An image forming apparatus of this type has a printer portion P and a reader portion R. Generally speaking, the printer portion P is made up of an image forming portion 11, a recording medium (paper) feeder unit 12, an intermediary transfer unit 13, a fixation unit 14, and a control unit (unshown). The image forming portion 11 has four image formation stations which are the same in structure.

The structure of the image forming portion 11 is as follows: The image forming portion 11 has multiple (four) photosensitive drums 15, which are image bearing members. Each photosensitive drum 15 is supported at the lengthwise ends of its shaft (drum shaft 15a). It is rotated in the counterclockwise direction indicated by an arrow mark in FIG. 1, by a driving apparatus 50 which is actually a driving force transmitting apparatus. The driving apparatus 50 will be described later. Each image formation station has a charging device 16, a developing device 17, and a cleaning apparatus 18, which are sequentially positioned in the adjacencies of the peripheral surface of the photosensitive drum 15, in the listed order. The image forming operation of this image forming apparatus is as follows. First, the peripheral surface of the photosensitive drum 15 is uniformly charged to preset polarity and potential level by the charging device 16, such as a charging device of the corona type. Next, a beam of light, for example, a beam of laser light, is projected, while being modulated with the image formation signals obtained by the reader portion R, upon the charged area of the peripheral surface of the photosensitive drum 15, by an optical system apparatus 19 provided with a light source, etc. In other words, the charged area of the peripheral surface of the photosensitive drum 15 is exposed to form an electrostatic latent image on the peripheral surface of the photosensitive drum 15. Then, the electrostatic latent image is developed by the developing device 17, which contains toner (developer) which is Y, M, C, or K in color, into a visible image formed of the toner (which hereafter will be referred to simply as toner image); the toner is adhered to the electrostatic latent image on the peripheral surface of the photosensitive drum 15 by the developing device 17. This toner image is transferred (first transfer) onto an intermediary transfer belt 21, in the first transfer portion T1; four toner images, different in color, are sequentially transferred onto the intermediary transfer belt 21, in the four first transfer portions T1, one for one. The toner remaining on the peripheral surface of the photosensitive drum 15 after the first transfer is removed by the cleaning apparatus 18.

The recording medium feeder unit 12 is made up of the recording medium feeder cassette 22, a recording medium feeder tray 23, a pickup roller 24, a recording medium conveyance path 25, a pair of registration rollers 26, etc. The sheets of recording mediums S in the recording medium feeder cassette 22 or recording medium feeder tray 23 are sent one by one into the recording medium conveyance path 25 by the corresponding pickup roller 24, and are conveyed through the recording medium conveyance path 25 to the pair of registration rollers 26. Then, each sheet of recording medium S (which hereafter will be referred to simply as recording medium S) is sent to the second transfer portion T2 by the pair of registration rollers 26 in synchronism with the progression of the image formation.

The intermediary transfer unit 13 has the intermediary transfer belt 21, which is an endless image bearing member which is supported and kept stretched in such a manner that it can be circularly moved. More specifically, the intermediary transfer belt 21 is supported, and kept stretched, by a driver roller 27, a tension roller 28, and a belt backing roller 29 (which hereafter may be referred to simply as backup roller 29) which backs up the intermediary transfer belt 21 against a second transfer roller. Among the three rollers 27, 28, and 29, the driver roller 27 is driven by the aforementioned driving apparatus 50, which will be described later. The tension roller 28 provides the intermediary transfer belt 21 with a preset amount of tension, in coordination with an unshown pressure applying means. The backup roller 29 opposes the second transfer roller, with the presence of the intermediary transfer belt 21 between the two rollers, forming thereby the second transfer portion T2. The backup roller 29 is rotated by the movement of the intermediary transfer belt 21; it is rotated by utilizing the friction between the intermediary transfer belt 21 and backup roller 29. The portion of the intermediary transfer belt 21, which is moving between the driver roller 27 and tension roller 28, opposes each of the four photosensitive drums 15. There are four charging blades 30 for the first transfer, which oppose the four photosensitive drums 15, one for one, in such a manner that the intermediary transfer belt 21 is pinched between the peripheral surface of each photosensitive drum 15 and each of the four charging blades 30. There is also a belt cleaning apparatus 31, which opposes the driver roller 27 with the presence of the intermediary transfer belt 21 between the belt cleaning apparatus 31 and driver roller 27.

The four toner images formed on the four photosensitive drums 15, one for one, are sequentially transferred (first transfer) onto the intermediary transfer belt 21 in the first transfer portion T1, by applying a preset voltage to the intermediary transfer belt 21 by the charge blades 30. After being transferred onto the intermediary transfer belt 21, the toner images on the intermediary transfer belt 21 are conveyed to the second transfer portion T2, in which they are transferred from the intermediary transfer belt 21 onto the recording medium S which is delivered to the second transfer portion T2 by the registration rollers 26 in synchronism with the arrival of the toner images on the intermediary transfer belt 21 at the second transfer portion T2. The toner on the intermediary transfer belt 21, which was not transferred in the second transfer portion T2, that is, the toner remaining on the intermediary transfer belt 21 after the second transfer, is removed by the belt cleaning apparatus 31, and conveyed to an unshown waste toner box.

The fixation unit 14 is provided with a fixation roller 33 and a pressure roller 34, which have an internal heat source 32, such as a halogen heater. It fixes the toner images (unfixed toner images), which have just been transferred onto the recording medium S in the second transfer portion T2, to the recording medium S. After the fixation of the toner images to the recording medium S, the recording medium S is discharged into a delivery tray 36 by a pair of discharge rollers 35. The operation of each of the mechanical or electro-mechanical portions described above is controlled by an unshown control unit. The image forming apparatus may be designed so that this control unit integrally controls the entirety of the operation of the image forming apparatus, including the aforementioned driving apparatus 50, which will be described next.

Next, referring to FIGS. 2 and 3, the driving apparatus 50 will be described. The driving apparatus 50 is a driving force transmitting apparatus which transmits driving force to the photosensitive drums 15 and the driver roller 27 of the intermediary transfer unit 13. Incidentally, the apparatus for driving the driver roller 27 of the intermediary transfer unit 13 is the same as the apparatus 50 for driving the photosensitive drum 15. Thus, only the driving apparatus for the photosensitive drum 15 will be described. The driving apparatus 50 is an apparatus which transmits the rotational force of a DC motor 51, which is the mechanical power source, to the photosensitive drum 15, while reducing the force in velocity. Thus, the driving apparatus 50 has: a driver pulley 52 which is rotationally driven by the DC motor 51; a follower pulley 53 with which the photosensitive drum 15 rotates; a toothless belt 54 stretched around the cylindrical peripheral surface 52a of the driver pulley 52 and the cylindrical surface 53a of the follower pulley 53. The driving force is transmitted from the pulley 52 to the pulley 53 by utilizing the friction between the belt 54 and the two pulleys 52 and 53. The belt 54 in this embodiment is toothless. However, the belt 54 may be in such a form that its cross section has multiple indentations, or is wavy. Further, it may be toothed. In other words, the present invention is applicable to any driving force transmitting apparatus, as long as it is structured so that driving force is transmitted between the two pulleys 52 and 53 by the utilization of the friction between the belt 54 and the two pulleys 52 and 53.

More specifically, the driver pulley 52, which is cylindrical, is in connection to the output shaft 51a of the DC motor 51. The driver pulley 51 is made of a metallic substance, and is roughly cylindrical. It has a circumferential groove 52b, which is in the middle of the driver pulley 51 in terms of the axial direction of the driver pulley 52. The bottom surface 52a of the circumferential groove 52b is toothless. The depth of the groove 52b is greater than the thickness of the aforementioned belt 54, which will be described later. Both of the lengthwise end portions 52c, relative to the groove 52b, of the driver pulley 52 are cylindrical, and engage with a driving force transmitting intermediary member 57 of the apparatus 50; the peripheral surface of each of the lengthwise end portions 52c engages with the peripheral surface of the driving force transmitting intermediary member 57 (which hereafter will be referred to simply as intermediary transmitting member 57), which will be will be described later. Hereafter, the lengthwise end portions 52c, which engage with the intermediary transmitting member 57, may be referred to as engaging portions 52c.

The aforementioned follower pulley 53 is in connection with the drum shaft 15a of the photosensitive drum 15. The follower pulley 53 also is made of a metallic substance, and is roughly cylindrical, like the driver pulley 52. It has a circumferential groove 53b, which is in the middle of the follower pulley 53, n terms of the axial direction of the follower pulley 53. The bottom surface 53a of the circumferential groove 53b is toothless. The depth of the groove 53b is also greater than the thickness of the belt 54. Both of the lengthwise end portions 53c, relative to the groove 53b, of the follower pulley 53 are cylindrical, and engage with the intermediary transmitting member 57 of the apparatus 50; the peripheral surface of each of the lengthwise end portions 53c engages with the peripheral surface of the intermediary transmitting member 57. Hereafter, the lengthwise end portion 53c, which engage with the intermediary transmitting member 57, may be referred to as engaging portions 53c. The follower pulley 53 is greater in diameter than the driver pulley 52. The dimension of the follower pulley 53 in terms of its axial direction is roughly the same as the dimension of the driver pulley 52 in terms of its axial direction. The material for the driver pulley 52 and follower pulley 53 is desired to be a hard metallic substance, such as stainless steel.

The toothless belt 54 is made of a ferric material such as stainless steel, and is wrapped around, being thereby kept stretched, by the driver pulley 52 and follower puller 53, bridging thereby between the bottom surface 52a of the groove 52c of the driver pulley 52, and the bottom surface 53a of the groove 53b of the follower pulley 53. The depth of the grooves 52b and 53b, which correspond to the bottom surfaces 52a and 53a, respectively, is greater than the thickness of the belt 54. Therefore, after the fitting of the belt 54 into the grooves 52b and 53b, the belt 54 does not protrude above the peripheral surface of engaging portion 52c and that of the engaging portion 53c. Further, the belt 54 is wrapped around a tension pulley 55, which is on the downstream side of the driver pulley 52 in terms of the moving direction of the belt 54. The tension pulley 55 is under the pressure from springs 56, and provides the belt 54 with a proper amount of tension.

Further, the intermediary transmission (or transmitting) member 57 between the driver pulley 52 and follower pulley 53 is also cylindrical. The belt 54 is wrapped around also the peripheral surface 57a of the intermediary transmitting member 57. The intermediary transmitting member 57 is a piece of a hollow cylinder (having through hole 58) made of a very hard and rigid metallic substance, such as stainless steel. It has a circumferential groove 57b, which is in the middle in terms of the axial direction of the intermediary transmitting member 57. The bottom surface 57a of the groove 57b is toothless. The depth of the groove 57b is also greater than the thickness of the belt 54. The intermediary transmitting member 57 is formed of a substance which is higher in rigidity than the material for the belt 54.

The lengthwise end portions of the intermediary transmitting member 57 are cylindrical, and function as engaging portions 57c, which engage with the engaging portion 52c of the driver pulley 52, and the engaging portion 53c of the follower pulley 53, one for one. The external diameter of each of the engaging portions 57c of the intermediary transmitting member 57 is greater than the distance between the engaging portion 52c of the driver pulley 52 and the engaging portion 53c of the follower pulley 53. The relationship in terms of external diameter among the engaging portions 57c, 52c, and 53c is to be set in consideration of the relationship between the efficiency with which the driving force is transmittable by the belt 54 and the reduction ratio (between driver pulley 52 and follower pulley 53 in terms of peripheral velocity), and the transmission efficiency of the intermediary transmitting member 57. For example, it is set so that external diameter of engaging portion 52c:external diameter of engaging portion 57c:external diameter of engaging portion 53c=1:2:8. In terms of axial direction, the dimension of the intermediary transmitting member 57 is roughly the same as the dimension of the driver pulley 52 and the dimension of the follower pulley 53. The peripheral surface of the engaging portions 57c of the intermediary transmitting member 57 is also minimized in coefficient of friction.

The intermediary transmitting member 57 is supported by a supporting shaft 59, which is put through the through hole 58 of the intermediary transmitting member 57. The supporting shaft 59 is rotatably supported by a pair of bearings 60, which are plane bearings, roller bearings, ball bearings, or the like. The lengthwise end portions of the supporting shaft 59 are loosely fitted in the cylindrical holes of the unshown frame of the apparatus; the diameter of the cylindrical holes is slightly larger than the external diameter of the supporting shaft 59. Further, the supporting shaft 59 is under the pressure applied to its lengthwise end portions by a pair of springs 61. More specifically, the base portion of each of the springs 61 is anchored to a part of the frame, and the opposite end of the spring 61 from the base portion is attached to the corresponding lengthwise end of the supporting shaft 59. Therefore, the intermediary transmitting member 57 supported by the supporting shaft 59 is also kept pressured in the preset direction by this pair of springs 61. The direction in which the intermediary transmitting member 57 is kept pressed by the pair of springs 61 is such direction that causes the intermediary transmitting member 57 to move into the gap between the driver pulley 52 and follower pulley 53, that is, toward where the gap between the driver pulley 52 and follower pulley 35 is narrowest. In the case of the structural setup shown in the drawing, however, the intermediary transmitting member 57 is on the tension pulley side (left side in FIG. 2) of the theoretical line L (dotted line) which connects the center of the driver pulley 52 and the center of the follower pulley 53. Therefore, the pressure applied to the intermediary transmitting member 57 by the pair of springs 61 works in the direction to increase the distance between the intermediary transmitting member 57 and tension pulley 55. Since the driving apparatus 50 is structured as described above, the intermediary transmitting member 57 is afforded a certain amount of positional latitude, and is properly positioned by being kept in contact with the driver pulley 52 and follower pulley 53. In comparison, the driver pulley 52 and follower pulley 53 are rotatably supported with the presence of no play relative to the frames, and therefore, they are stable in the position of their rotational axis.

The belt 54 is stretched in such a manner that it wraps the tension pulley side of the peripheral surface 57a of the intermediary transmitting member 57. Thus, the intermediary transmitting member 57 is kept wedged between the driver pulley 52 and follower pulley 53 by the tension of the belt 54. That is, the intermediary transmitting member 57 is on the tension pulley side of the aforementioned theoretical line L, as described above. Further, the belt 54 is stretched so that it wraps around the tension pulley side of the intermediary transmitting member 57 to keep the intermediary transmitting member 57 pressed by the tension of the belt 54, toward where the gaps between the driver pulley 52 and follower pulley 53 is narrowest. Therefore, it is ensured that the engaging portions 57c of the intermediary transmitting member 57 are kept in contact with the engaging portions 52a of the driver pulley 52, and the engaging portions 53a of the follower pulley 53, by the coordination of the tension of the intermediary transmitting member 57 and the pressure from the above described pair of springs 61, providing thereby a proper amount of contact pressure between the intermediary transmitting member 57 and driver pulley 52, and between the intermediary transmitting member 57 and follower pulley 53. Incidentally, as long as the proper amount of contact pressure can be provided between the engaging portions 57c of the intermediary transmitting member 57 and the engaging portions 52a of the driver pulley 52, and between the engaging portions 57c of the intermediary transmitting member 57 and the engaging portions 53a of the follower pulley 53, by the belt tension alone, the pair springs 61 may be eliminated.

Figure 2:
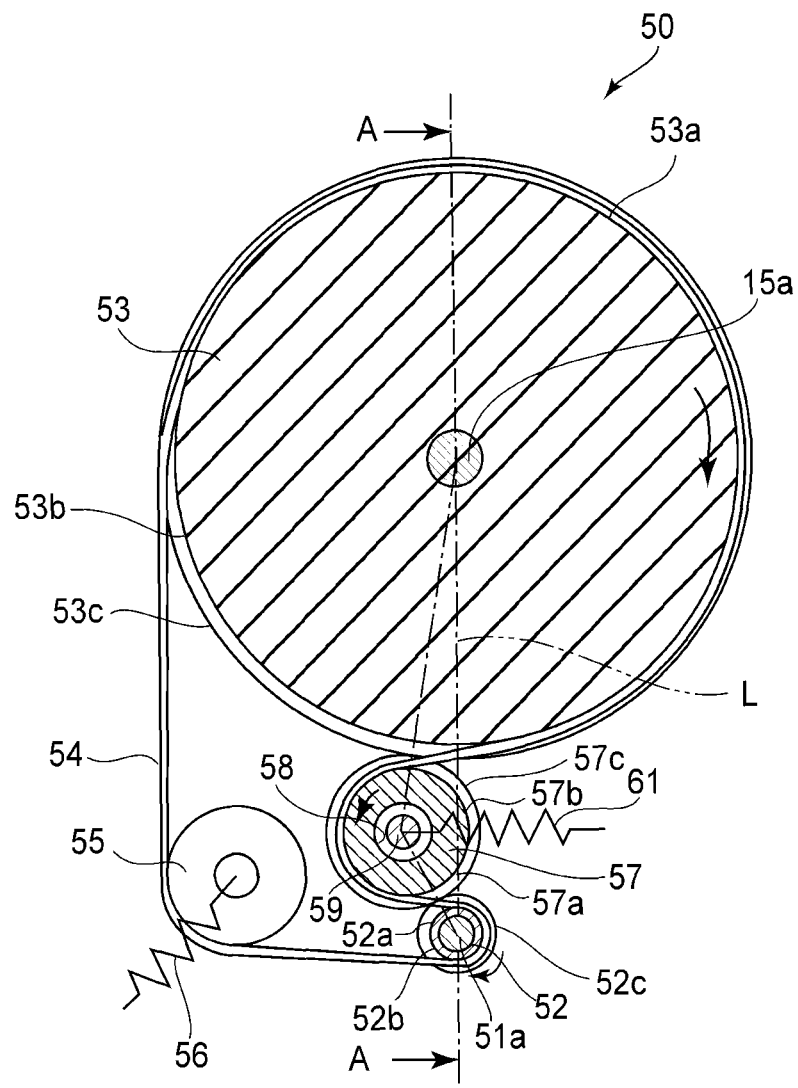
FIG. 2 is a partly cutaway view for illustrating the driving device in the First Embodiment.
Figure 3:
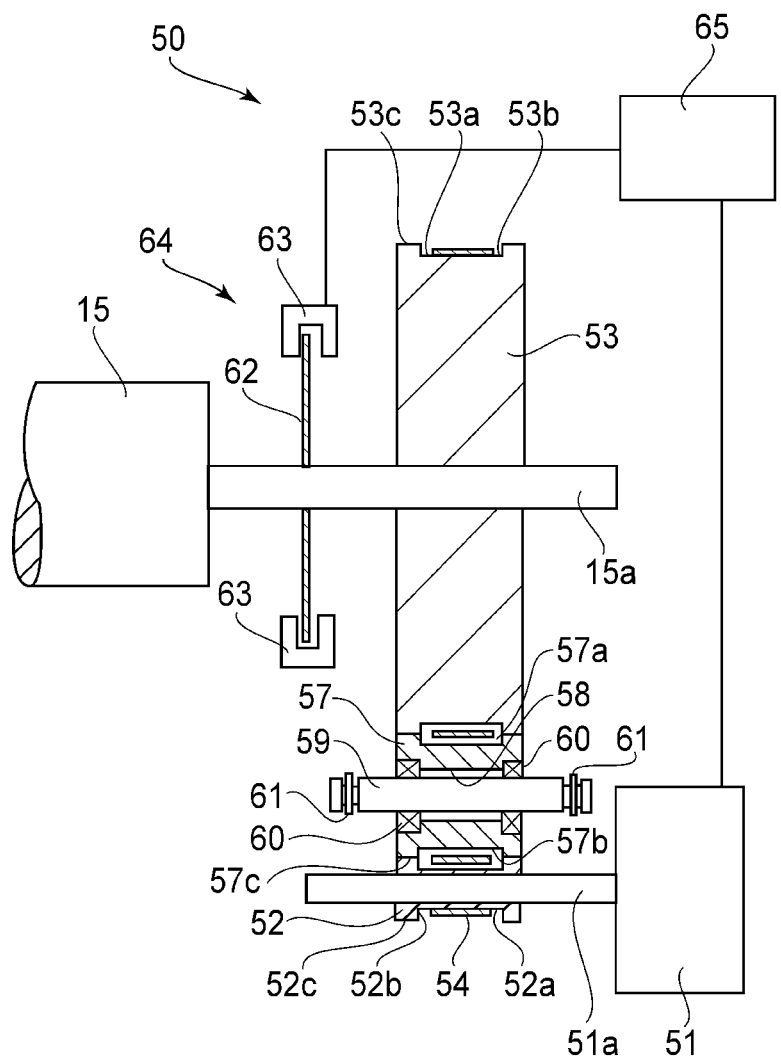
FIG. 3 is a sectional view taken along A-A line indicated in FIG. 2.

Referring to FIG. 2, since the driving apparatus 50 is structured so that the intermediary transmitting member 57 is between the driver pulley 52 and follower pulley 53, and the belt 54 is wrapped around the tension pulley side of the intermediary transmitting member 57. Therefore, the belt 54 is wrapped around the driver pulley 52 and follower pulley 53 by a sufficient angle. In other words, the area of contact between the belt 54 and peripheral surface 52a of the driver pulley 52, and the area of contact between the belt 54 and the peripheral surface 53a of the follower pulley 53, are substantial in size. Therefore, it is ensured that the driving force is reliably transmitted from the driver pulley 52 to the follower pulley 53 by the belt 54. Incidentally, the intermediary transmitting member 57 may be positioned on the opposite side (right side in FIG. 2) of the theoretical line L from the tension pulley 55. In such a case, however, the intermediary transmitting member 57 is kept pressed by the tension of the belt 54, in the direction to increase the distance between the intermediary transmitting member 57 and driver pulley 52, and the distance between the intermediary transmitting member 57 and follower pulley 53. Therefore, the pair of springs 61 have to be made large enough in resiliency to keep the intermediary transmitting member 57 wedged between the two pulleys 52 and 53.

Further, the driving apparatus 50 has an encoder wheel 62, which is solidly attached to the shaft 15a of the photosensitive drum 15. It has also at least one detecting portion 63, which is in the adjacencies of the peripheral surface of the encoder wheel 62. The encoder wheel 62 and detecting portion 63 make up a rotational speed detecting means 64, making it possible to detect the rotational speed of the photosensitive drum 15. The signals outputted as the detecting portion 63 detects the rotational speed of the photosensitive drum 15 are sent to a control portion 65 as a controlling means. The control portion 65 controls the DC motor 51 in response to the signals sent from the detecting portion 63, controlling thereby the driver pulley 52 in rotational speed. Incidentally, the control portion 64 may be a part of the control unit described above, or independent from the control unit.

The driving apparatus 50 structured as described above rotates the photosensitive drums 15 by transmitting driving force from the DC motor 51 to the photosensitive drums 15 by transmitting the driving force from the driver pulley 52 to the follower pulley 53 through the belt 54 and intermediary transmitting member 57. As long as the image forming apparatus is normally operating, that is, as long as the load resulting from the driving of the image forming portions does not substantially change, the driving force from the DC motor 51 is satisfactorily transmitted by way of the belt 54. However, if the load to which the follower pulley 53 is subjected suddenly reduce in amount, or reverses in direction, that is, if the load to which the follower pulley 53 is subjected changes in amount, the belt 54 is allowed to slacken, failing thereby to transmit the diving force by a satisfactorily amount. In this embodiment, however, when the image forming apparatus is in the above described condition, the driving force from the DC motor 51 is transmitted from the driver pulley 52 to the follower pulley 53 by the intermediary transmitting member 57, and therefore, the driving force is reliably transmitted to the follower pulley 53. To describe in more detail, the intermediary transmitting member 57 is higher in rigidity than the belt 54. Therefore, even if the load to which the follower pulley 53 is subjected changes in amount and/or direction, the intermediary transmitting member 57 does not deform like the belt 54. Therefore, it is ensured that the driving force from the DC motor 51 is satisfactorily transmitted to the follower pulley 53 by being transmitted by way of the intermediary transmitting member 57. Therefore, it does not occur that the image forming portions reduces in responsiveness. Next, referring to FIGS. 4 to 6, this feature of the driving apparatus 50 in this embodiment will be described in detail.

Figure 4:
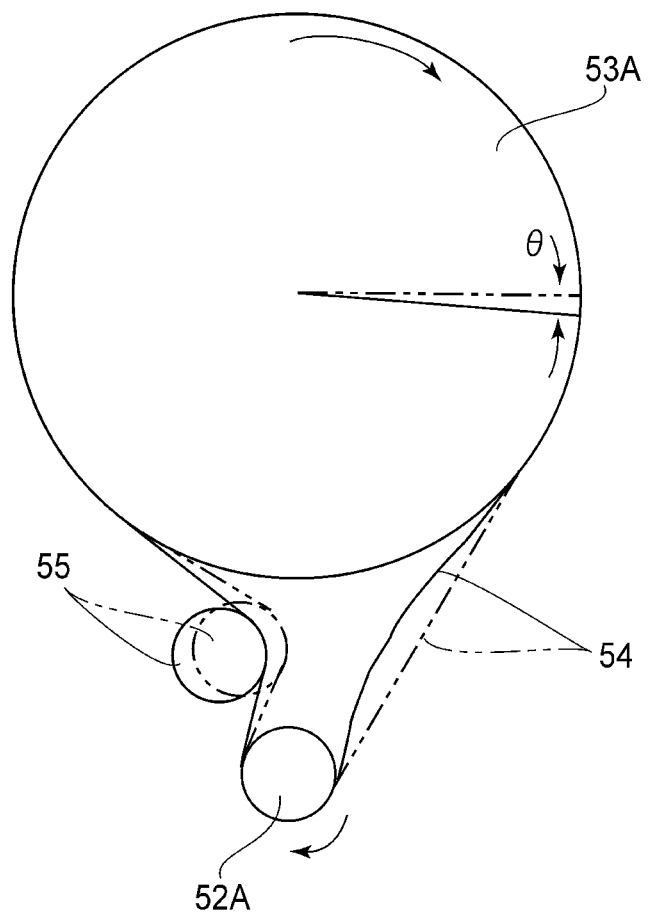
FIG. 4 is a schematic view showing a state in which a load variation occurs in a conventional structure.
Figure 5:
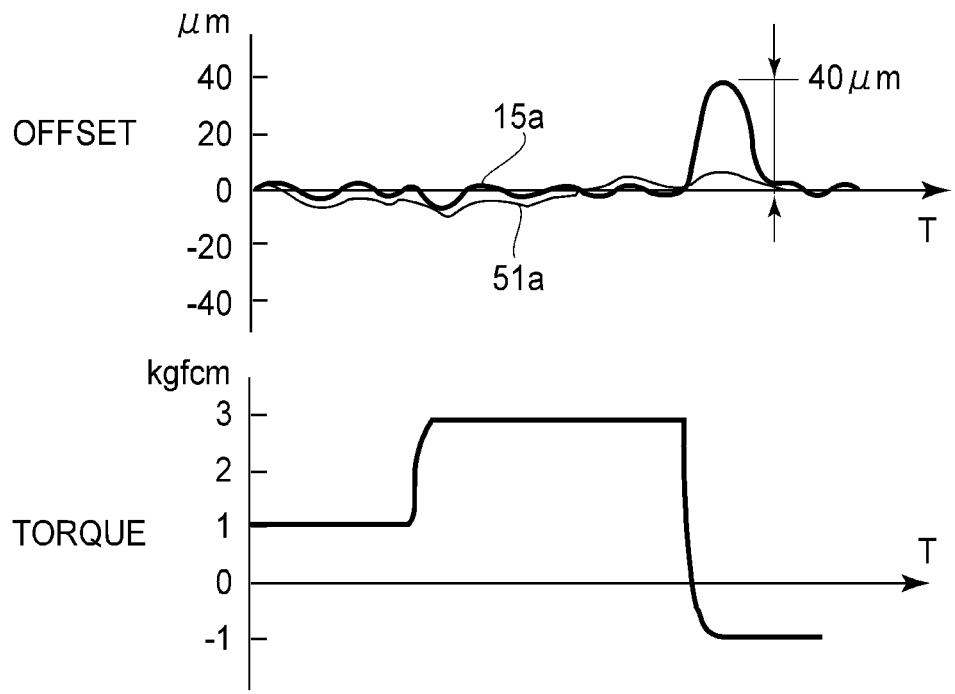
FIG. 5 is a graph showing a relationship between the load variation and positional deviation amount in the conventional structure.
Figure 6:
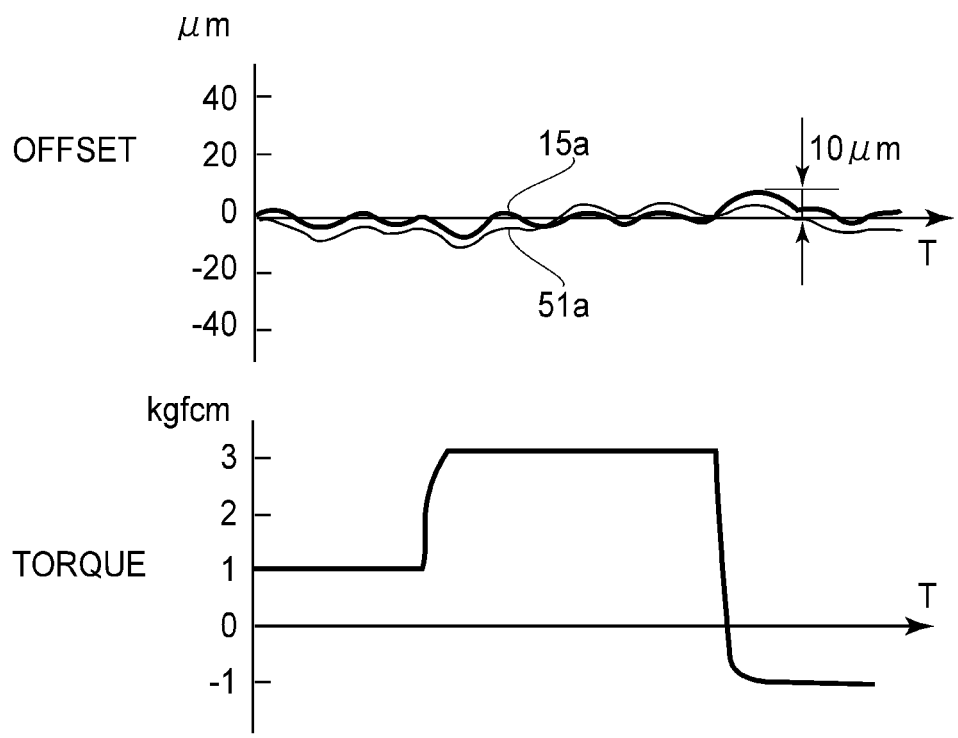
FIG. 6 is a graph showing a relationship between the load variation and the positional deviation amount in the First Embodiment.

FIG. 4 is a schematic sectional view of a driving force transmitting apparatus which does not have the intermediary transmitting member 57. The inventors of the present invention performed the following experiments to compare, in structure, the driving force transmitting apparatus in FIG. 4 with the driving apparatus 50, or the driving force transmitting apparatus in this embodiment. That is, the distance between the drum shaft 15a and output shaft 51a was measured while the amount of torque (load) to which the follower pulleys 53 and 53A are subjected was varied by controlling the rotational speed of the photosensitive drum 15. FIGS. 5 and 6 show the results of this experiment. In FIGS. 5 and 6, the vertical axis stands for the amount of torque (load) to which the follower pulleys 53 and 53a were subjected, and the amount of the positional deviation of the follower pulleys 53 and 53a, and rotational axis (output shaft 51a) of the driver pulleys 52 and 52A, whereas the horizontal axis stands for the elapsed time. FIG. 5 shows the test results of the driving force transmitting apparatus shown in FIG. 4, that is, a driving force transmitting apparatus which does not have the intermediary transmitting member 57. FIG. 6 shows the test results of the driving apparatus 50, that is, the driving force transmitting apparatus in this embodiment, which is structured as shown in FIGS. 2 and 3. The amounts of positional deviation shown in FIGS. 5 and 6 are represented by the values equivalent to the positional deviation of the peripheral surface of the photosensitive drum 15. These experiments were performed under the following conditions.

The photosensitive drum 15 was 30 mm in diameter, and the driver pulley 52 was 12.06 mm in diameter. The follower pulley 53 was 96.48 mm in diameter, and the intermediary transmitting member 57 was 24.12 mm in diameter. Further, the tension pulley 55 was 23.96 mm in diameter. Further, the driver pulley 52A and follower pulley 53A were 11.96 mm and 95.96 mm, respectively, in diameter. Incidentally, the abovementioned diameters of the driver pulley 52, follower pulley 53, and intermediary transmitting member 57 are the diameters of the engaging portions 52c, 53c, and 57c, respectively. The depths of the grooves 52b, 53b, and 57b are 0.05 mm, 0.26 mm, and 0.08 mm, respectively. As the material for each pulley and intermediary transmitting member, stainless steel was used. The belt 54 was 0.04 mm in thickness, 12 mm in width, and 420 mm in length. It was made of stainless steel. The revolution of the DC motor (hence, revolution of driver pulleys 52 and 52A) was 1,068 rpm, and the target revolution for the follower pulleys 53 and 53A and the photosensitive drum 15 was 133.5 rpm. Each of the pair of springs 56 by which the tension pulley 55 was kept pressed was 31 N in resiliency, providing thereby the belt 54 with 46 N of tension when the belt 54 is under no load (when driving force is not transmitted).

Referring to FIGS. 5 and 6, in both the case of the structural arrangement, the test results of which are shown in FIG. 5, and the case of the structural arrangement, the test results of which are given in FIG. 6, the drum shaft 15a slightly shifted relative to the output shaft 51a in the direction in which the belt 54 was moved, that is, the positive direction in the graphs (FIGS. 5 and 6), even if there is no change in the amount of the load. On the other hand, as the amount of the load changed in the positive direction, the drum shafts 15a gradually shifted in the negative direction. In either case, however, the positional deviation (shifting) was slight. In comparison, in the case where the load reversed in direction, that is, the sign of the value which shows the amount of the load changed from plus to minus, the amount by which the positional deviation occurred to the drive shaft 15a (photosensitive drum 15) of the driving force transmitting apparatus which does not have the intermediary transmitting member 57 was very large, as shown in FIG. 5. Consequently, a certain amount of play (slackening) occurred to the portion of the belt 54, which was between the upstream side of the driver pulley 52A and the downstream side of the follower pulley 53A in terms of the belt movement direction, as depicted by the solid line in FIG. 4. Thus, the follower pulley 53A becomes unsynchronized relative to the driver pulley 52A by a rotational angle of θ.

To describe this subject in more detail, in more detail, if the load to which the follower pulley 53A is subjected suddenly reduces, the torque stored in the driving system is instantly released, whereby the follower pulley 53A is made to temporarily overrun in the moving direction of the belt 54 (this phenomenon is similar in nature to the temporary vibrations which occurs as the right hand is moved away from an object which is being dragged by the left hand, with the presence of a piece of rubber band between the left hand and the object, while securing the object with the right hand). In particular, as the load becomes negative (reverse in direction), the follower pulley 53A is driven by the downstream portions of the image forming apparatus in terms of the direction in which the driving force is normally transmitted, the follower pulley 53A becomes large in the amount of its overrun. In the case of the driving force transmitting apparatus which is not provided with the intermediary transmitting member 57, the relationship, in terms of rotational phase, between the driver pulley 52A and follower pulley 53A cannot be precisely regulated. Therefore, the amount of the overrun such as the above-described one, is large. Therefore, the amount of the positional deviation of the drum shaft 15a (photosensitive drum 15) is substantial. Thus, in the case of a driving force transmitting apparatus structured as shown in FIG. 4, it is difficult to keep the speed of the follower pulley 53A at a preset value by controlling the drum shaft 15a in rotational speed.

In comparison, in this embodiment, the follower pulley 53 is driven by utilizing the friction between the driver pulley 52 and intermediary transmitting member 37, and the friction between the intermediary transmitting member 57 and follower pulley 53, by placing the intermediary transmitting member 57 in contact with the driver pulley 52 and follower pulley 53. Therefore, the relationship, in angle of rotation, between the driver pulley 52 and follower pulley 53 can be more strictly controlled than in the case of the conventional driving force transmitting apparatuses. Being able to more strictly controlling the relationship, in rotational angle, between the driver pulley and follower pulley can more effectively control the transmission of driving force, based on the detected rotational speed of the photosensitive drum 15. As will be evident from the comparison between the results given in FIG. 5 and those in FIG. 6, in the case of the driving force transmitting apparatus, the test results of which are given in FIG. 5, the positional deviation (shifting) of the drive shaft 15a (photosensitive drum 15) was roughly 40 μm, whereas in the case of the driving apparatus 50, that is, the driving force transmitting apparatus in this embodiment, the test results of which are given in FIG. 6, the positional deviation (shifting) of the drive shaft 15a (photosensitive drum 15) was roughly 10 μm. In other words, the experiments confirmed that the driving apparatus 50, that is, the driving force transmitting apparatus in accordance with the present invention, was a substantial improvement over the conventional ones. That is, if an image forming apparatus of the tandem type, such as the one shown in FIG. 1, can be reduced in the amount of the positional deviation of its photosensitive drum 15, it is possible to prevent the misalignment among the monochromatic images, which occurs in the image forming portions. Therefore, it is possible to prevent a full-color image forming apparatus of the tandem type from outputting multicolor images (which are obtained by layering multiple monochromatic images different in color) which suffer from color deviation.

Also in the case of this embodiment, even if the image forming apparatus is in the condition in which the belt 54 might slip at the time of startup, the driving force is transmitted by the intermediary transmitting member 57, and therefore, the driving force transmission failure, which might have occurred, due to the slippage, in the case of conventional driving force transmitting apparatuses, does not occur. Thus, the driving apparatus 50, that is, the driving force transmitting apparatus in this embodiment, last substantially longer than any of the conventional driving force transmitting apparatuses for an image forming apparatus. To describe this subject in more detail, the length by which the belt 54 is wrapped around the driver pulley 52 is less than the length by which the belt 54 is wrapped around the follower pulley 53. Thus, it is between the driver pulley 52 and belt 54 that slipping is likely to occur as the DC motor 51 is started up. In this embodiment, however, the driving force from the DC motor 51 can be transmitted from the driver pulley 52 to the follower pulley 53 by way of the intermediary transmitting member 57. That is, the driving force can be transmitted through the engaging portions 52c, 53c, and 57c. Thus, as the DC motor 51 is started up, the intermediary transmitting member 57 is initially driven directly by the driver pulley 52, whereby the follower pulley 53 is driven by the rotationally driven by the intermediary transmitting member 57. Then, the follower pulley 53 is rotationally driven by the belt 54, with no slipping. In other words, even if the image forming apparatus is in the condition in which the belt 54 might slip, the driving force is transmitted to the follower pulley 53 by way of the intermediary transmitting member 57. Therefore, the belt 54 does not slip. Incidentally, in order to make it easier to understand the mechanism of the transmission of the driving force from the DC motor 51, the mechanism was described in steps. In reality, however, the movement of these components virtually instantly (simultaneously) occurs.

In this embodiment, the intermediary transmitting member 57 is positioned on the tension roller side (opposite side from side from which belt 54 is wrapped around intermediary transmitting member 57) of the theoretical line L which connects the center of the driver pulley 52 and the center of the follower pulley 53. Therefore, as the DC motor 51 is started, the intermediary transmitting member 57 is pressed by the tension of the belt 54 in the direction to wedge into the gap between the driver pulley 52 and follower pulley 53, whereby friction is increased across the areas of contact between the engaging portions 52a, 53a, and 57a and the belt 54, ensuring thereby further that the belt 54 is unlikely to slip. As long as the belt 54 can be prevented from slipping, it is possible to prevent the belt 54 from being prematurely worn and/or breaking. In other words, the present invention can makes a driving force transmitting apparatus (50) more durable.

Also in this embodiment, not only is the driving force transmitted by the belt 54, but also, by the intermediary transmitting member 57. Therefore, the amount of the tension with which the belt 54 needs to be provided to prevent the positional deviation of the photosensitive drum 15 does not need to be as large as that in the case of conventional driving force transmitting apparatuses. Therefore, the amount of the load which is applied to the driver pulley 52 and follower pulley 53 by the tension of the belt 54 in their radial direction of the pulleys is smaller than that in the case of the conventional driving force transmitting apparatuses. Therefore, the driving apparatus 50, that is, the driving force transmitting apparatus in this embodiment, is significantly less likely to collapse, and also, is significantly smaller in the amount of the frictional wear of the driver pulley 52 and follower pulley 53, than the conventional driving force transmitting apparatuses. In other words, the present invention can provide a driving force transmitting apparatus which is substantially more durable than the conventional ones.

Further, because the driving force transmitting apparatus in this embodiment is provided with the intermediary transmitting member 57, it is substantially greater in the angle by which the belt 54 is wrapped around the driver pulley 52 and follower pulley 53, than the conventional ones, as described above. Therefore, it is substantially greater than conventional ones, in the efficiency with which the driving force is transmitted by the belt 54. That is, as long as a driving force transmitting apparatus can be improved in the efficiency with which the driving force is transmitted by the belt 54, it is unnecessary to increase the apparatus in the efficiency with which the driving force is transmitted by the intermediary transmitting member 57, and therefore, it is unnecessary to increase the apparatus in the amount of contact pressure among the engaging portions 52c, 53c, and 57c, and the belt 54. Thus, the driving force transmitting apparatus in this embodiment is substantially smaller in the amount of the frictional wear of these engaging portions 52c, 53c, and 57c, and therefore, the driving force transmitting apparatus in this embodiment is significantly more durable than the conventional ones. For example, in the case of a driving force transmitting apparatus which transmits driving force only by the intermediary transmitting member 57, that is, without employing the belt 54, the apparatus has be greater in the amount of the contact pressure across the areas of contact among the engaging portions 52c, 53c, and 57c than a driving force transmitting apparatus having the intermediary transmitting member 57. In the case of the driving force transmitting apparatus in this embodiment, both the belt 54 and intermediary transmitting member 57 are used for driving force transmission. Therefore, the contact pressure among the engaging portions 52c, 53c, and 57c of the apparatus in this embodiment does not need to be as high as that in the conventional ones. Thus, the driving force transmitting apparatus in this embodiment is significantly more durable than the conventional ones.

Embodiment 2

Figure 7:
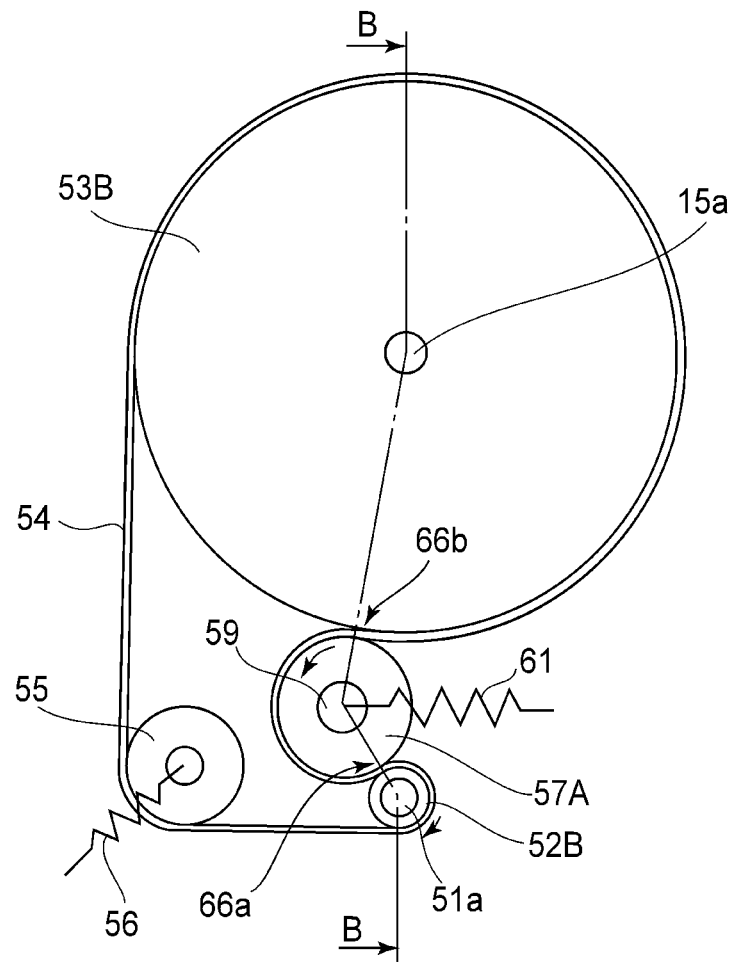
FIG. 7 is a schematic view of a driving device in a Second Embodiment.
Figure 8:
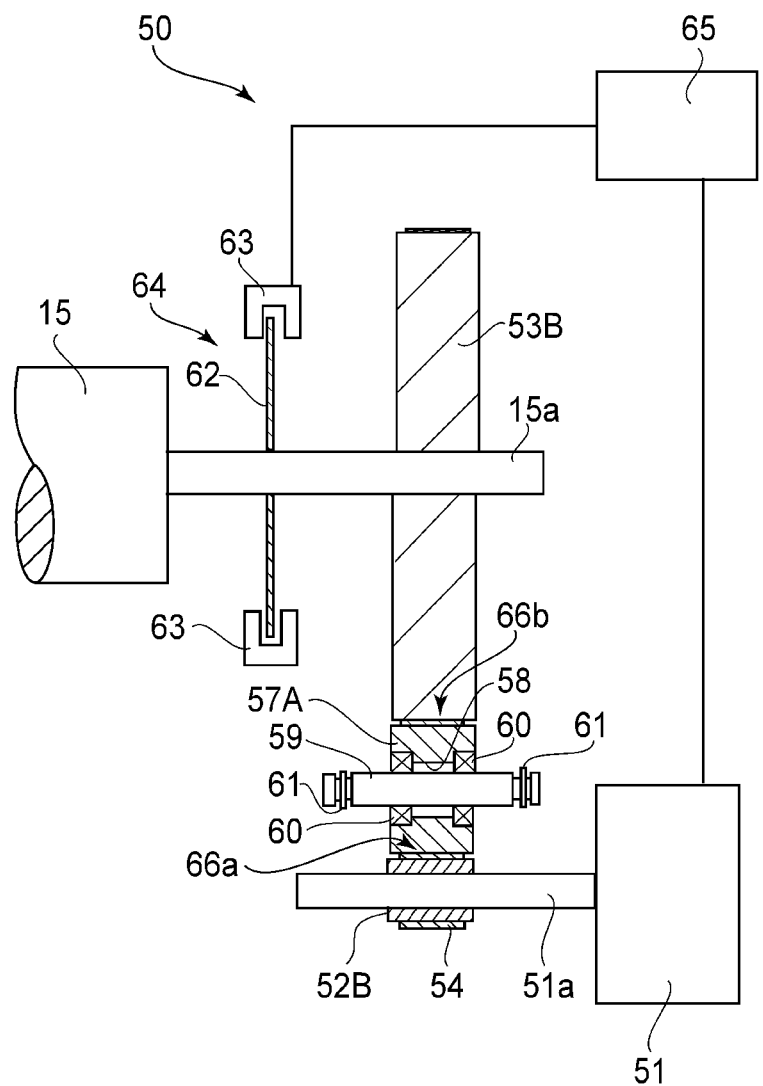
FIG. 8 is a sectional view taken along B-B line indicated in FIG. 7.

Next, referring to FIGS. 7 and 8, the second preferred embodiment of the present invention will be described. In this embodiment, the intermediary transmitting member 57A is not directly in contact with the driver pulley 52B and follower pulley 53B because of the presence of the belt 54 between the intermediary transmitting member 57 and driver pulley 52, and also, between the intermediary transmitting member 57 and follower pulley 53B. That is, the belt 57 remains pinched by the peripheral surface of the driver pulley 52B and the peripheral surface of the intermediary transmitting member 57, and also, by the peripheral surface of the follower pulley 53B and the peripheral surface of the intermediary transmitting member 57 (forming thereby nips 66a and 66b). That is, in this embodiment, the two pulleys 52B and 53B, and the intermediary transmitting member 57, are in the form of a plane cylindrical member; the peripheral surface of the driver pulley 52B, peripheral surface of the 53B, and peripheral surface of the intermediary transmitting member 57, do not have a groove. Otherwise, the driving force transmitting apparatus in this embodiment is the same in structure as the driving force transmitting apparatus in the first embodiment. Therefore, the structural components, members, etc., of the apparatus in this embodiment, are given the same referential codes as those given to their counterparts of the apparatus in the first embodiment, and will not described here.

In this embodiment, the intermediary transmitting member 57A is kept wedged between the two pulleys 52B and 53B by a pair of springs 61. Therefore, the driving force transmitting apparatus in this embodiment is higher in the amount of force with which the belt 54 is pinched in the nips 66a and 66b than the conventional ones. Further, in the case of the driving force transmitting apparatus in this embodiment, the belt 54 is wrapped around the tension pulley side of the intermediary transmitting member 57A, and the intermediary transmitting member 57A is kept under the pressure which works in the direction to wedge the intermediary transmitting member 57A into the gap between the two pulleys 52B and 53B. Therefore, not only is the belt 54 of the driving force transmitting apparatus in this embodiment less likely to slacken than that of the conventional ones, but also, the driving force transmitting apparatus in this embodiment is greater than the conventional ones, in the amount of force with which the belt 57 is pinched in the nips 66a and 66b. Thus, in this embodiment, the relationship, in terms of rotational phase, between the driver pulley 52B and follower pulley 53B is more strictly regulated, being therefore more desirable in terms of the response to a control command. In other words, this embodiment of the present invention also proved that the present invention can prevent the photosensitive drum 15 from deviating in position, and therefore, can prevent an image forming apparatus from outputting multicolor images, that is, images made up of layered monochromatic images, different in color, which suffer from chromatic deviation.

Further, the driver pulley wrapping portion of the belt 54, which is in the nip 66a, that is, the nip resulting from the pinching of the belt 54 by the driver pulley 52B and intermediary transmitting member 57A, is different in the distribution of the normal force from the comparable portion of the belt 54 of any of the conventional driving force transmitting apparatuses. Ordinarily, the distribution of the normal force across the pulley wrapping portion of the belt 54 is such that the normal force is higher across the center of the pulley wrapping portion of the belt 54 than across the end portions of the pulley wrapping portion of the belt 54, and is zero at the ends. In this embodiment, however, one of the ends of the pulley wrapping portion of the belt 54 coincides with the nip 66a in which the belt 54 is pinched by the driver pulley 52 and intermediary transmitting member 57A, being therefore greater in the normal force. Therefore, the total amount of the normal force in this embodiment is greater than that of any of the conventional driving force transmitting apparatuses. Therefore, the amount of torque transmitted between the driver pulley 52B and intermediary transmitting is greater; the belt 54 is prevented from slipping.

Further, the intermediary transmitting member 57A is positioned on the tension roller side of the theoretical line L which connects the center of the driver pulley 52B and the center of the follower pulley 53B. Therefore, as the DC motor 51 is started, the intermediary transmitting member 57 is subjected to such a force that works in direction to cause the intermediary transmitting member 57 to wedge into the gap between the driver pulley 52B and follower pulley 53B, whereby the normal force is increased, which in turn makes it unlikely for the belt 54 to slip.

The embodiments described above are effective even if the driving force transmitting apparatus is not controlled in response to the detected rotational speed of the photosensitive drum 15. That is, the structural arrangements, in the first and second embodiments, for the driving force transmitting apparatus is for strictly regulating the relationship in terms of rotational phase between the driver pulley 52 (52B) and follower pulley 53 (53B) (for improving driving force transmitting apparatus in responsiveness). Therefore, the structural arrangements make it easier for the changes in the load to which the follower pulley 53 and 53B are subjected, to be transmitted to the drive shaft of the DC motor. Ordinarily, a motor is under its own internal control so that it remains stable in rotational speed. Therefore, the faster the speed with which the changes in the rotation of the follower pulleys 53 and 53B are transmitted, the faster the recovery, and therefore, the smaller the position deviation of the photosensitive drum 15. Further, even if the motor D is not controlled by its own control system so that it remains stable in rotational speed, the inertia of the drive shaft of the motor D (rotor inertia) functions as a force which counters the changes in the load to which the follower pulleys 53 and 53A are subjected. The amount of this force equals the square of the reduction ratio. Therefore, the driving force transmitting apparatus in this embodiment is smaller in the amount of the positional deviation of the drum shaft 15a than any of the conventional ones, even if the motor D is not controlled in rotation speed.

Further, the driver pulleys 52 and 52B, follower pulleys 53 and 53B, intermediary transferring members 56 and 56A, and tension pulley 55, may be shaped, as necessary, so that in terms of the cross-sectional view, their peripheral portions (peripheral surfaces 52a and 53a) arc outward. The employment of this structural arrangement can easily prevent the belt 54 from shifting in the direction perpendicular to the direction in which the belt 54 is driven. Further, the materials for the pulleys 52, 52B, 53, 53B, and intermediary transferring members 56 and 56A are desired to be a highly rigid metallic substance. However, a substance other than the highly rigid metallic substance may be employed as the material for these components, provided that these components are for a driving force transmitting apparatus which is relatively low in the changes in the amount of the load, or according to the target amount of color deviation. When a substance other than the rigid metallic substance is used as the material for these components, the material for the belt 54 should be a substance which is lower in hardness than the material for the metallic belt. For example, it should be rubber.

According to the present invention, even if the load to which the follower pulley is subjected changes, the driving force is transmitted by the intermediary transmitting member, which is higher in rigidity than the belt 54. Therefore, it is ensured that the driver pulley and follower pulley quickly and accurately respond to each other in terms of rotation. Further, if an image forming apparatus is used under the condition in which the belt of its driving force transmitting apparatus may slip, the driving force is transmitted by the intermediary transmitting member, preventing thereby the belt from slipping. In other words, the present invention can provide a driving force transmitting apparatus which is substantially more durable than any of the conventional driving force transmitting apparatuses.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 185128/2009 filed Aug. 7, 2009 which is hereby incorporated by reference.

What is claimed is:

1. A driving force transmitting apparatus comprising:
   a driving source;
   a drive pulley rotatable by a driving force supplied from said driving source;
   a follower pulley rotatable with a member to be rotated;
   a belt member extending around a cylindrical surface of said driving pulley and a cylindrical surface of said follower pulley; and
   an intermediate transmission member which contacts said driving pulley and said follower pulley, wherein said intermediate transmission member has a rigidity higher than that of said belt member.

2. An apparatus according to claim 1, wherein said belt member is extended around said intermediate transmission member so that a tension of said belt member urges said intermediate transmission member in a direction of pushing said intermediate transmission member between said driving pulley and said follower pulley.

3. An apparatus according to claim 1, further comprising an urging member for urging said intermediate transmission member between said driving pulley and said follower pulley.

4. An apparatus according to claim 1, wherein an outer diameter of the cylindrical surface of said follower pulley is larger than an outer diameter of the cylindrical surface of said driving pulley.

5. An apparatus according to claim 1, wherein said belt member is a metal belt.

6. An apparatus according to claim 1, further comprising rotational speed detecting means for detecting a rotational speed of said follower pulley, and control means for controlling a rotational speed of said driving pulley on the basis of an output signal of said rotational speed detecting means.

7. An image forming apparatus comprising an image bearing member, toner image forming means for forming a toner image on said image bearing member, and a driving force transmitting apparatus according to claim 1 for driving said image bearing member, which is the member to be rotated.

8. A driving force transmitting apparatus comprising:
a driving source;
a drive pulley rotatable by a driving force supplied from said driving source;
a follower pulley rotatable with a member to be rotated;
a belt member extending around a cylindrical surface of said driving pulley and a cylindrical surface of said follower pulley; and
an intermediate transmission member which is arranged with a part of said belt member interposed directly between said driving pulley and said intermediate transmission member and with a part of said belt member interposed directly between said intermediate transmission member and said follower pulley, wherein said intermediate transmission member has a rigidity higher than that of said belt member.

9. An apparatus according to claim 8, wherein said belt member is extended around said intermediate transmission member so that a tension of said belt member urges said intermediate transmission member in a direction of pushing said intermediate transmission member between said driving pulley and said follower pulley.

10. An apparatus according to claim 8, further comprising an urging member for urging said intermediate transmission member between said driving pulley and said follower pulley.

11. An apparatus according to claim 8, wherein an outer diameter of the cylindrical surface of said follower pulley is larger than an outer diameter of the cylindrical surface of said driving pulley.

12. An apparatus according to claim 8, wherein said belt member is a metal belt.

13. An apparatus according to claim 8, further comprising rotational speed detecting means for detecting a rotational speed of said follower pulley, and control means for controlling a rotational speed of said driving pulley on the basis of an output signal of said rotational speed detecting means.

14. An image forming apparatus comprising an image bearing member, toner image forming means for forming a toner image on said image bearing member, and a driving force transmitting apparatus according to claim 8 for driving said image bearing member, which is the member to be rotated.

* * * * *